(12) United States Patent
Stefik et al.

(10) Patent No.: US 7,861,186 B2
(45) Date of Patent: Dec. 28, 2010

(54) SYSTEMS AND METHODS FOR NAVIGATING PAGE-ORIENTED INFORMATION ASSETS

(75) Inventors: Mark J. Stefik, Portola Valley, CA (US); Stuart K. Card, Los Altos, CA (US); Ed H. Chi, Palo Alto, CA (US); Lichan Hong, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 421 days.

(21) Appl. No.: 11/784,288

(22) Filed: Apr. 6, 2007

(65) Prior Publication Data

US 2008/0040378 A1   Feb. 14, 2008

Related U.S. Application Data

(60) Provisional application No. 60/801,203, filed on May 17, 2006.

(51) Int. Cl.
   *G06F 3/00* (2006.01)
   *G06F 3/14* (2006.01)
   *G06F 3/048* (2006.01)

(52) U.S. Cl. .............. 715/850; 715/757; 715/782; 715/848; 715/852; 715/864

(58) Field of Classification Search .............. 715/757, 715/782, 848, 850, 852, 864
   See application file for complete search history.

(56) References Cited

U.S. PATENT DOCUMENTS

| | | | |
|---|---|---|---|
| 5,072,412 A | 12/1991 | Henderson, Jr. et al. | |
| 5,233,687 A | 8/1993 | Henderson, Jr. et al. | |
| 5,394,521 A | 2/1995 | Henderson, Jr. et al. | |
| 5,533,183 A | 7/1996 | Henderson, Jr. et al. | |
| 5,838,326 A | 11/1998 | Card et al. | |
| 5,847,709 A | 12/1998 | Card et al. | |
| 6,486,895 B1 | 11/2002 | Robertson et al. | |

(Continued)

OTHER PUBLICATIONS

Nextup Technologies, "TextAloud Description", downloaded Apr. 2, 2007 from <http://www.nextup.com/textaloud>.

(Continued)

*Primary Examiner*—Weilun Lo
*Assistant Examiner*—Truc T Chuong
(74) *Attorney, Agent, or Firm*—Patrick J. S. Inouye; Scott E. Smith

(57) ABSTRACT

Techniques provide for the dynamic display of a page-oriented information asset using an audio output mode. Pluralities of elements in the page-oriented information asset are determined based on chapters, sections, paragraphs, sentences, words and the like. The elements are rendered to an audio output mode. Optionally selectable representations of the elements are also determined and output using a 3-dimension-like rendering to a visual output mode. The 3-dimension-like rendering of the visual representations of the elements shows how the current element relates to the other elements and its location within the page-oriented information asset. The 3-dimension-like rendering provides visual orientation or context within the page-oriented information asset. The visual representations of the elements are optionally selectable as spatial context indicators providing direct navigation control to support reading, browsing and information retrieval tasks within the page-oriented information asset. Speech input is also optionally recognized as a direct navigation control.

16 Claims, 5 Drawing Sheets

U.S. PATENT DOCUMENTS 6,577,330 B1 * 6/2003 Tsuda et al. ............. 715/782
2005/0034084 A1 * 2/2005 Ohtsuki et al. ........... 715/864

OTHER PUBLICATIONS

Naturalsoft Ltd., "Natural Reader Description", downloaded Apr. 2, 2007 from <http://naturalreaders.com/>.

Technology Associates, "Etext Reader" downloaded Apr. 2, 2007 from <http://linux.techass.com/projects/etr/>.

e-Bility Pty. Ltd. "e-Bility disABILITY Information Resources", downloaded Apr. 2, 2007 from <http://www.e-bility.com/links/software.php>.

Innovative Rehabilitation Technology Inc, "eClipse Reader Description 1", downloaded Apr. 2, 2007 from <http://www.eclipsereader.com/main.html>.

Innovative Rehabilitation Technology Inc, "eClipse Reader Description 2", downloaded Apr. 2, 2007 from <http://www.eclipsereader.com/productsECR.html>.

Cragside Accessability Ltd., "Bookcourier Portable Reader Description", downloaded May 10, 2006 from <http://cragside.com/accessability/bookcourier/>.

Recording for the Blind and Dyslexic, "Victor Reader Pro Instructions", downloaded May 10, 2006 from <http://rfbdnj.org/victor.html>.

Microsoft Corp., "Microsoft Reader Accessability Description", downloaded Apr. 2, 2007 from <http://www.microsoft.com/reader/info/support/faq/accessability.asp>.

Microsoft Corp., "Press Release", downloaded Apr. 5, 2007 from <http://www.microsoft.com/presspass/press/2000/Jan00/AudiblePR.mspx>.

* cited by examiner

SYSTEMS AND METHODS FOR NAVIGATING PAGE-ORIENTED INFORMATION ASSETS

This application claims the benefit of Provisional Patent Application No. 60/801,203 filed May 17, 2006, the disclosure of which is incorporated herein by reference, in its entirety.

BACKGROUND OF THE INVENTION

1. Field of Invention

This invention relates to reading and navigating media on small devices.

2. Description of Related Art

In our fast paced society, user attention is an increasingly scarce resource. As a result, many people turn to tools and devices that can help them perform multiple activities at the same time. For example, commute time on trains is frequently used to catch up on reading. During trips many people use laptops to extend their workspace into the semi-public spaces of airplanes, trains and buses.

Commuters and others use conventional audio books, books on tape, iPod and MP-3 files and similar works to complete continuing education requirements on trains, airplanes, or during other travel time. These conventional audio works allow people to perform incidental commute-related tasks such as monitoring train or bus stations, navigating transportation connections while simultaneously reviewing news, fiction, or professional information using conventional audio-tape players, CD-players and the like.

While these conventional devices have advantages in terms of cost and ubiquity, they fail to support key reading operations, such as skimming, browsing, and navigating, or focusing on specific parts. For example, conventional audio books and similar materials do not easily integrate diagrams or other visual elements typically used in lectures, seminars, newspapers and the like. Thus, handouts or detailed audio descriptions of the relevant diagrams must be produced off-line. This increases production and delivery costs.

Moreover, the reverse, play, forward and stop navigation controls of these conventional devices are ill-suited to reviewing cognitively dense material. Users of cognitively dense materials browse, search and skim through the work for relevant content. However, reading platforms such as conventional audio-books do not provide dynamic structural orientation and/or navigation within the work that easily supports these tasks. The difficulty a user experiences in orienting themselves within a work coupled with the difficulty of finding and re-starting the audio work at the relevant bookmarked location reduces the effectiveness of these conventional reading devices. These challenges may be exacerbated in a mobile context where the user is prone to interruptions or the need to tend to other things in the environment. For example, a user may have to tend momentarily to things going on in the environment—e.g. "Is this my train stop coming up?" and is likely to stop listening. Thus, systems and methods that support the navigation of page-oriented information assets using visual orientation and navigation cues would be useful.

SUMMARY OF THE INVENTION

Systems and methods according to this invention provide for the dynamic display of a page-oriented information asset using an audio output mode. Pluralities of elements in the page-oriented information asset are determined based on chapters, sections, paragraphs, sentences, words and the like. The elements are rendered to an audio output mode. Optionally selectable representations of the elements are also determined and output using a 3-dimension-like rendering to a visual output mode. The 3-dimension-like rendering of the visual representations of the elements shows how the current element relates to the other elements and its location within the page-oriented information asset. The 3-dimension-like rendering provides visual orientation or context within the page-oriented information asset. The visual representations of the elements are optionally selectable as spatial context indicators providing direct navigation control to support reading, browsing and information retrieval tasks within the page-oriented information asset. Speech input is also optionally recognized as a direct navigation control.

DETAILED DESCRIPTION OF EXEMPLARY EMBODIMENTS

Figure 1:
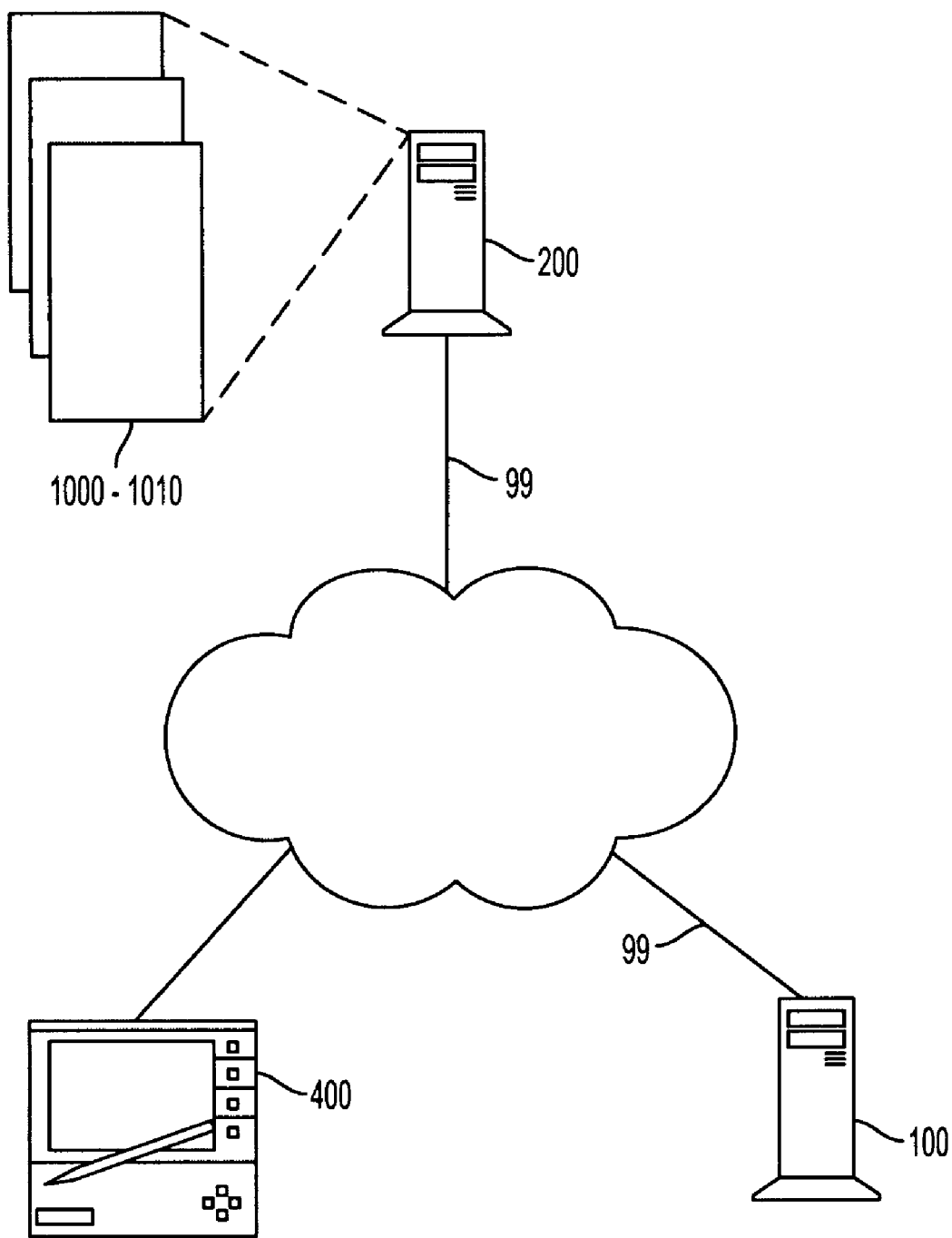
FIG. 1 shows an overview of an exemplary system for navigating page-oriented information assets according to an aspect of this invention.

FIG. 1 shows an overview of an exemplary system for navigating page-oriented information assets 100 according to an aspect of this invention. The system for navigating page-oriented information assets 100 is connected via communications links 99 to an information repository 200 providing access to page-oriented information assets 1000-1010 and to a smartphone 400.

In one exemplary embodiment, a user of the smartphone 400 requests a page-oriented information asset 1001 from the information repository 200. The request is mediated over the communications links 99 by the system for navigating page-oriented information assets 100. The plurality of pages, chapters, sections, paragraphs, sentences, words, or other elements associated with an audio-book, an audio-magazine, an audio-newspaper or any other page-oriented audio-asset are identified.

Elements to be displayed or output via the audio and visual output modes are then determined. For example, if the audio asset is associated with textual representations, a text-to-speech system is used to generate spoken language audio output. If the page-oriented information asset incorporates audio speech information such as a lecture or notes from a seminar or the like, an automatic speech recognition system determines corresponding textual representations for the speech elements. In still other embodiments, the page-oriented information asset is pre-processed to include information suitable for both the audio and visual output mode. This reduces the processing requirements of reading devices but may increase memory and storage requirements of the page-oriented information assets.

Selectable direct navigation controls are then created for the visual 3-dimension-like output by associating the current output element with a selectable user interface element such as a selectable visual representation of the elements, a button, a switch or the like. A 3-dimension-like representation includes representations indicating more than 2 dimensions. For example, 2.5 dimensional representations that indicate some or all aspects of a $3^{rd}$ dimension by outline or the like as well as 3-dimensional representations are defined as 3-dimensional-like for the purposes of this application. The display is synchronized between the audio and visual output modes. Selecting visual representations of elements other than the current element synchronizes the audio output mode to the newly selected visual representation element. The selectable direct controls may include inter-element indicators that show how the current element fits between surrounding elements. A spatial context indicator may be used to visually indicate how the current element fits within the page-oriented information asset as a whole. In various embodiments, voice commands are optionally recognized for navigating to identified pages, chapters, sections, paragraphs, and/or other selectable elements of the work.

Page-oriented information assets such as lecture notes or audio-books containing diagrams or figures use optional attention attracting signals such as beeps or tones. The optional attention attracting signals output via the audio output mode attract the user's attention to the visual output mode. The attention attracting signals direct attention to the visual display where a diagram associated with the attention attracting signal is displayed. The user selects the diagram or otherwise clears the attention attracting signal and the rendering continues via the audio output mode and the synchronized visual output mode of the display.

It will be apparent that in various exemplary stand-alone embodiments according to this invention, the system for navigating page-oriented information assets 100 is embedded within a reading device such as a pocket computer, a cell phone, a smartphone 400 or the like. The page-oriented information assets may be retrieved from local memory or storage and/or may be retrieved from remote repositories or services.

Figure 2:
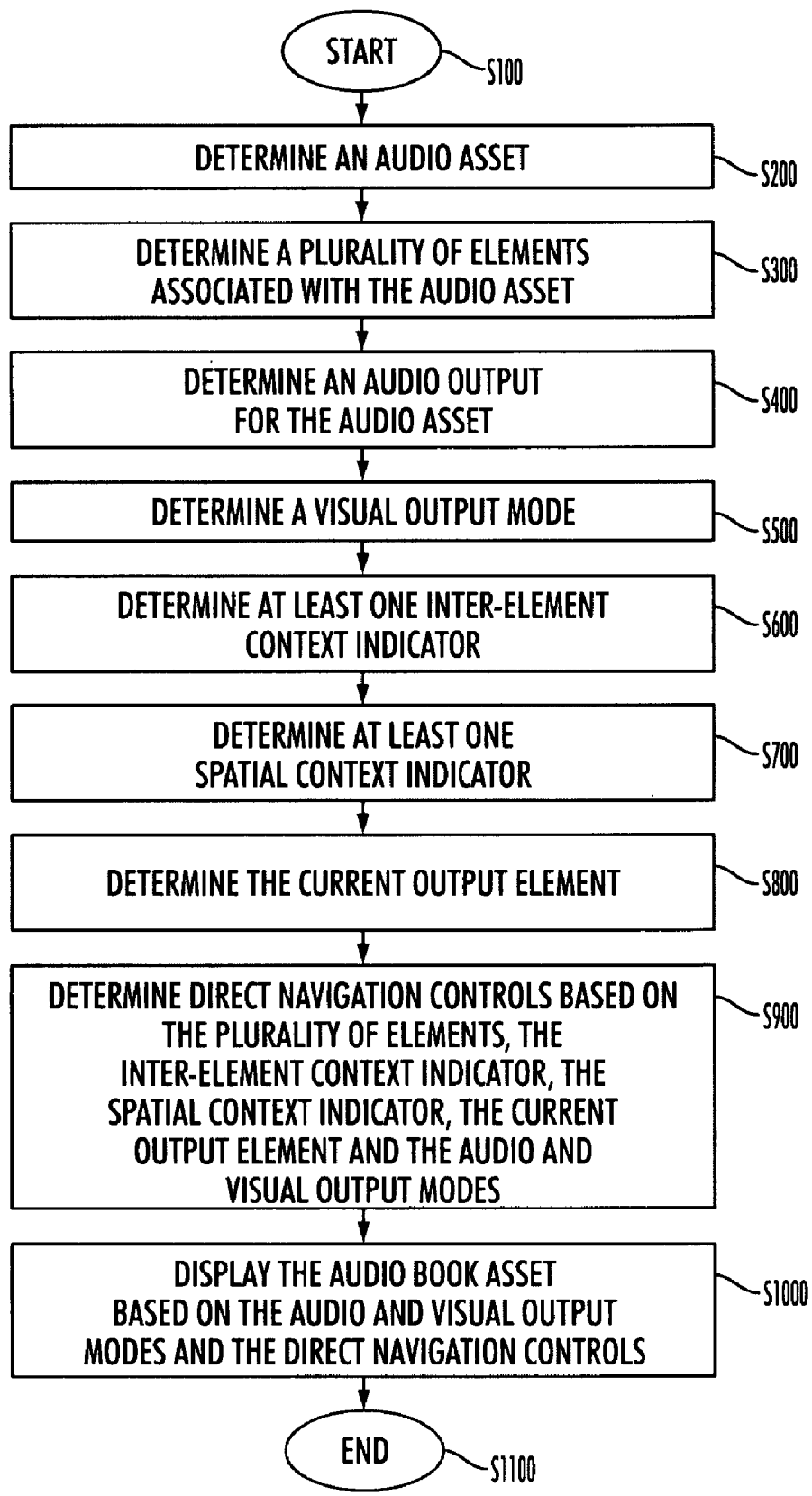
FIG. 2 is a flowchart of an exemplary method for navigating a page-oriented information asset according to an aspect of this invention.

FIG. 2 is a flowchart of an exemplary method for navigating a page-oriented information asset according to an aspect of this invention. The process begins at step S100 and immediately continues to step S200. In step S200 a page-oriented information asset is selected. The page-oriented information asset may be a file containing speech, text or other temporally ordered information associated with audio. For example, text file based books useable to generate spoken audio-books using text to speech systems can also be used in the practice of this invention. The page-oriented information asset is retrieved from local memory or remote storage. Remote storage may include, but is not limited to a digital library, a web server, an ftp server, a database, a compact disk, a media storage card such as a SD Card and/or various other known or later developed types of information repository. After the page-oriented information asset has been determined, control continues to step S300.

In step S300, a plurality of elements associated with the page-oriented information asset are determined. In an exemplary audio book embodiment, each element is associated with structures such as pages, chapters, sections, paragraphs, words, sentences or other elements associated with the page-oriented information asset. After the plurality of elements has been determined, control continues to step S400.

The audio output mode of the page-oriented information asset is determined in step S400. The communicative content of the page-oriented information asset will be primarily conveyed by speaker, headphones or other audio output mode device. However, it should be apparent that Bluetooth headphones, ear-buds, and various other modes of audio-output can also be selected and used in the practice of this invention. Once the audio output mode has been selected, control continues to step S500.

In step S500, a visual output mode is selected. The visual output mode is used to convey the direct navigation information for the page-oriented information asset. Thus, in one exemplary audio book embodiment, direct navigation controls for the page-oriented information asset are displayed as selectable visual elements on the screen of a pocket computer device. In the various exemplary embodiments, the visual output mode is always used to give a persistent, visual sense of how the current element relates to the rest of the work using a visual 3-dimension-like rendering.

The visual output mode can also be used to present direct navigation controls to the user although the direct navigation controls can also be provided by separate buttons, pads or other user interface elements. Thus, it should be apparent that the display of a smartphone, a cell phone, and/or various other known or later developed visual displays may be used in the practice of this invention. After the visual output mode has been selected, control continues to step S600.

A visual inter-element context indicator is determined in step S600. Inter-element context-indicators provide mapping cues that indicate how the current element being output via the audio output mode relates to the preceding and following elements. That is, the inter-element context indicator shows how the current element fits within the page-oriented information asset as a whole. Inter-element context indicators may include, but are not limited to increased font size, italics or other display characteristics useful in indicating inter-element context. The inter-element context indicators are rendered via the visual output mode. After the inter-element context indicators have been determined, control continues to step S700.

In step S700 at least one spatial context indicator is determined. The spatial context indicator provides overall orientation within the page-oriented information asset using the visual output mode. For example, in one audio-book embodiment according to this invention, the spatial context indicator shows where the current output element fits within the page-oriented information asset as a whole. After the spatial context indicator has been determined, control continues to step S800.

The current output element is determined in step S800. The current output element indicates via the visual output mode, the element currently being output via the audio output mode. The current element cursor may use an enlarged font, an attention directing display attribute such as blinking, bolding, italics and the like. However, any display characteristic useful in directing a user's attention and which is appropriate to the display used for the visual output mode may be used without departing from the spirit or scope of this invention. After the current output element has been determined, control continues to step S900.

In step S900, direct navigation controls are determined based on the plurality of elements, the inter-element context indicator, the spatial context indicator, the display cursor and the audio and visual output modes. In one exemplary embodiment, the elements are paragraphs of an audio-book type of page-oriented information asset. The inter-element context indicators may include visual display characteristics associated with the paragraphs that precede and follow the paragraph indicated by the display cursor.

Direct navigation controls are determined by making the elements or groups of elements preceding and following the display cursor selectable. When a different word or element is selected, the current output element is set to the selected paragraph or element. Thus, if a previously output paragraph is selected, the output stream is reset to begin output at the selected paragraph. Similarly, selecting a paragraph or element that has not yet been output will set the current output element to the selected paragraph. This facilitates skimming of audio notes, audio-books and/or other page-oriented information assets. Selectable representations of prior and/or following pages and/or other structural elements of the page-oriented information asset can also be rendered via the visual output mode.

In one exemplary embodiment, gestures are used to navigate over various types of structures within the page-oriented information asset. For example, in one embodiment, a single leftward gesture on a touch sensitive display is interpreted as a navigation request to move to the preceding structural element such as a sentence. Two leftward gestures in quick succession may be interpreted as a navigation request to move to the preceding higher level structure such as a page, a chapter, a section, a paragraph or the like. This provides non-modal navigation that obviates the need to explicitly switch between the various types or levels of structures. The structural levels may be user-defined or defined externally. In various other embodiments, the mapping of the non-modal gestures can be specified or personalized for each user. However, is should be apparent that the use of modal interfaces requiring explicit selection to switch between the types of structural elements also lies within the scope of this invention. Thus, a user may select pages, chapters, sections, paragraphs, sentences, words or other portions of a page-oriented information asset for navigation. The selectable representations provide an intuitive means for direct contextual navigation within the audio-book type of page-oriented information asset. After the direct navigation controls have been determined, control continues to step S1000.

The page-oriented information asset is rendered using the audio output mode in step S1000. The direct navigation controls are or output via the visual output mode. The 3-dimension-like rendering provides a means for maintaining orientation within the page-oriented information asset using an output mode associated with lower cognitive overhead.

For example, most users of an audio book type of page-oriented information asset find it difficult to conceptualize more than a few bookmarks within the asset. However, by representing the bookmarks on a visual display, spatial mapping cues allow the information to be absorbed and/or retained more easily. Beyond bookmarks, the visual display shows how the current output element (at various levels) relates to the rest of the work. In other words, it shows the current word located in the current sentence, the current sentence within the current paragraph, the current paragraph within the current section and/or the current page within the stack of pages that make up the asset.

The visual display is dynamically updated as new current output elements are selected and rendered. This helps maintain inter-element and spatial context for the user via the visual output mode. Control then continues to step S1100 and the process ends.

Figure 3:
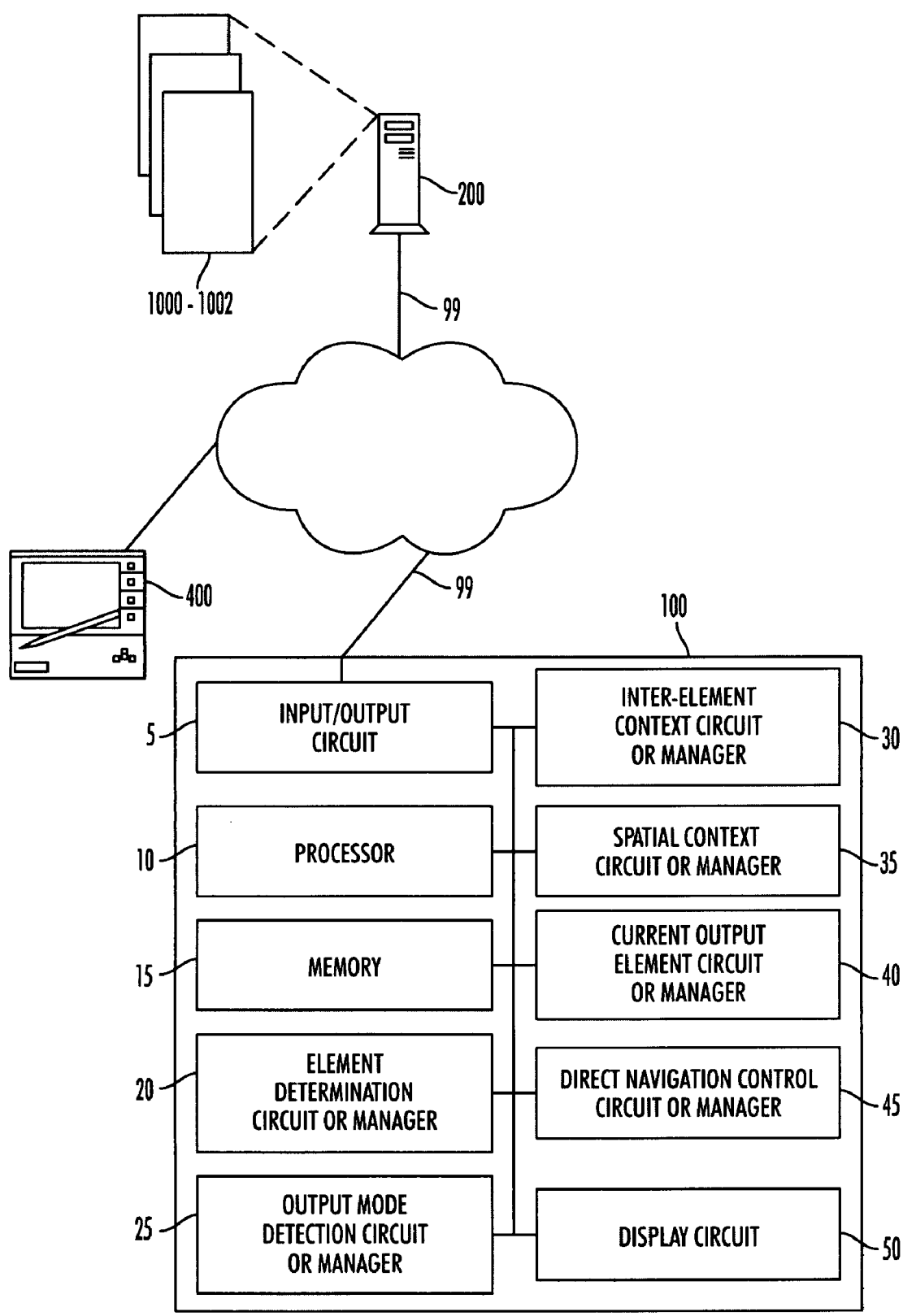
FIG. 3 shows a first exemplary system for navigating page-oriented information assets according to an aspect of this invention.

FIG. 3 shows a first exemplary system for navigating page-oriented information assets according to an aspect of this invention. A smartphone 400 is connected via communications links 99 to the system for navigating page-oriented information assets 100 and to an information repository 200 serving page-oriented information assets 1000-1002.

A user of the smartphone 400 initiates a request for a page-oriented information asset 1001 from the information repository 200. The request is mediated by the system for navigating page-oriented information assets 100. The processor 10 of the system for navigating page-oriented information assets 100 activates the input/output circuit 5. The input/output circuit 5 retrieves the page-oriented information asset 1001 from the information repository 200 via the communications links 99.

The processor 10 activates the element determination circuit or manager 20. The element determination circuit or manager 20 determines elements of the page-oriented information asset 1001. The elements are associated with pages, chapters, sections, paragraphs, speaker or character identification, words, sentences and/or other structures associated with the page-oriented information asset 1001.

The processor 10 then activates the output mode detection circuit 25 to identify devices for association with the audio and visual output modes of the page-oriented information asset. Generally the audio output mode and the visual output mode are directed to audio and visual output within the same device such as a pocket computer or the like. However, in various other exemplary embodiments, external Bluetooth headphones, ear-buds and the like are associated with the audio output mode. Similarly, an external cell phone display may be associated with the visual output mode without departing from the scope of this invention.

The processor 10 renders the page-oriented information asset via the audio output mode. The current output element circuit or manager 40 is activated to determine the current element output via the audio output mode. For example, in one exemplary embodiment, the current output element is associated with the element currently output via a text to speech synthesizer or the like.

The inter-element context circuit or manager 30 is activated to determine an indication of how the current element relates to the elements before and after the current element. The inter-element context indication is rendered on the currently selected visual output mode.

A visual display characteristic is optionally used to increase the prominence of the current element being output by increasing the font size of the visual representation of the element over the size of preceding or following visual representations of elements. However, it will be apparent that various other methods of indicating inter-element context may also be used without departing from the spirit or scope of this invention.

The spatial context circuit or manager 35 is then activated. The spatial context circuit or manager 35 indicates where the current element being output fits within the page-oriented asset as a whole. In another exemplary embodiment, a visual 3-dimension-like representation of the page-oriented information asset is used. For example, a visual 3-dimension-like representation of an open book is displayed for an audio-book type of page-oriented information asset. A representation of the number of pages displayed on the left and right side of the 3-dimension-like book provides an intuitive means for quickly conveying the spatial location within the audio-book type of page-oriented information asset. The orientation within the audio-book type of page-oriented information asset re-uses spatial cues and therefore induces less cognitive overhead for the user. Thus, a quick glance at the 3 dimension-like visual representations of the elements provides the user with a spatial orientation within the audio-book type of page-oriented information asset.

In various other exemplary embodiments according to this invention, a visual 3-dimension-like representation of an open newspaper, a magazine or other page-oriented tangible medium is displayed. In this way, the context information from the page-oriented tangible medium is used to provide cues to the user within the digital environment. A 3-dimension-like representation includes representations indicating more than 2 dimensions. For example, 2.5 dimensional representations that indicate some or all aspects of a $3^{rd}$ dimension by outline or the like as well as 3-dimensional representations are defined as 3-dimensional-like for the purposes of this application.

The direct navigation control circuit or manager 45 is activated to determine one or more direct controls for rendering via the visual output mode. In an exemplary embodiment the visual output is rendered on the display of a pocket computer. The direct navigation controls are implemented as user selectable visual representations of the elements of the page-oriented information asset. The current output element is the element currently output via the audio output mode. When the user selects a visual representation associated with a second element, the second element becomes the current output element. The current output element rendered via the audio output mode is updated or synchronized so that rendering proceeds from the newly selected element. Orientation within the page-oriented information asset as a whole is facilitated by the spatial context indicators. Thus, selecting a representation of a page midway within the page-oriented information asset updates the current output element to the element on the page midway through the page-oriented information asset as indicated by the spatial context indicators. This provides intuitive direct navigation controls that facilitate browsing, information retrieval and general reading tasks within newspapers, magazines, books and other types of page-oriented information assets. It will be apparent that user interface elements including, but not limited to switches and buttons may be associated with the direct navigation controls without departing from the spirit or scope of this invention.

The display circuit 50 is activated to render the audio and visual output on the display of a user's device. In one exemplary embodiment, the information is forwarded over the communications links 99 to the user of the smartphone 400. In still other embodiments, the page-oriented information asset is combined and/or annotated with visual output mode information using an integrated markup language such as Synchronized Multi-Media Integration Language (SMIL). In one exemplary embodiment, the mark-up language is not "media synchronized" if the audio is generated automatically by a text-to-speech generator, thereby eliminating the need for the recording of someone reading the material. However, it will be apparent that various methods of providing the direct navigation controls may be used without departing from the scope of this invention.

In other embodiments, the input/output circuit 5 is activated to return the annotated page-oriented information asset to the user of the smartphone 400 over communications links 99. The SMIL annotated page-oriented information asset is then rendered on the smartphone 400.

It will be apparent that in various other exemplary embodiments according to this invention, the system for navigating page-oriented information assets 100 can be embedded within the smartphone 400, a stand-alone computer or device such as an MP-3 player, a CD-ROM or the like, embedded within the information repository 200 or the like.

Figure 4:
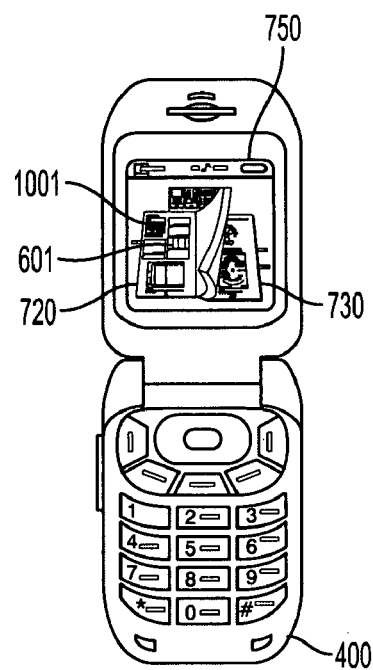
FIG. 4 shows an embedded system for navigating page-oriented information assets according to an aspect of this invention.

FIG. 4 is a smartphone 400 incorporating an embedded system for navigating a page-oriented information asset 1001 according to an aspect of this invention. The system for navigating page-oriented information assets (not shown) embedded within the smartphone 400 renders a two page 3-dimension-like representation on the display that orients the user within the page-oriented information asset 1001. In one exemplary embodiment, a page-oriented information asset 1001 to be rendered is selected from internal storage, a compact flash, USB thumb-drive, and an SD card, downloaded from a remote information repository over a WiFi, CDMA, GPRS, Edge and/or other communication links.

The page-oriented information asset 1001 is associated with a plurality of structural elements. For example, in one exemplary embodiment, an audio-book type of page-oriented information asset is associated with a plurality of elements where each element corresponds to spoken pages, chapters, sections, paragraphs, sentences, words and/or other elements associated with the page-oriented information asset. Selectable representations of the elements are determined and displayed via the visual output mode. In other exemplary embodiments, the page-oriented information asset is pre-processed to generate and integrate the audio and visual output mode information into a combined page-oriented information asset to reduce processing requirements on the output device. The page-oriented information asset is preprocessed to create selectable visual output mode representations of the elements. The selectable visual representations of the elements and the direct navigation controls are rendered on the display of the smartphone 400 while the audio is output via a speaker, ear-buds or other audio output device.

An exemplary inter-element context indicator 601 shows how the current paragraph element relates to the paragraph surrounding the current output element. A spatial context indicator 700 is comprised of a first spatial indicator 720 indicated by a 3-dimension-like representation or facsimile of stacked pages on the left side of the book. For users of English and other left to right oriented languages, this provides a low cognitive overhead indicator of pages preceding the current element.

A second spatial indicator 730 provides a 3-dimension-like representation of how many pages occur after the current output element. These first and second spatial indicators 720-730 provide visual orientation with respect to the current position within the page-oriented information asset as a whole. Each element of the page-oriented information asset is output via the speaker (not shown) associated with the smartphone 400. In other exemplary embodiments, the audio information is output via Bluetooth or plug-in ear-buds, headphone stereo speakers or the like. In various exemplary embodiments, navigation transitions are represented as animations. That is, a jump of several pages is represented as an animation showing the turning of sets of several pages on the visual output.

In other embodiments according to this invention, a single page 3-dimension-like representation is used to maximize the display space available to display visual representations of elements. In still other embodiments, the elements are rendered as flowed text. Elements under the user's focus of attention are zoomed or enlarged for reading while the context is maintained. In other embodiments according to this invention, textual and/or other representations of the elements are poured or flowed onto a representation of the page. In this way context within the 3-dimension-like representation of the audio-book type of page-oriented information asset is maintained. This is useful for maintaining orientation context on small devices that lack hardware to pan and zoom the 3-dimension-like images.

Elements of the page-oriented information asset 1001 are associated with a visual representation of the element on the screen of the smartphone 400. A cursor optionally indicates the element currently being output. The current display cursor may be a display attribute associated with the visual representation of the element such as increased font size, italics, bolding, underlining, blinking or the like.

The inter-element context indicator 601 and the spatial context indicators 720-730 are updated based on which element is currently selected for display. The user optionally navigates within the page-oriented information asset 1001 by selecting 3-dimension-like visual representations of the elements, context indicators, bookmarks or other portions of the 3-dimension-like rendering. The current element is then updated to reflect the new location within the page-oriented information asset 1001. The output of the elements via the audio output mode continues from the newly selected element. The user is thereby provided with an intuitive, easily navigable interface to the audio-book type of page-oriented information asset. The elements may be chapters, sections, paragraphs, pages, sentences, words and/or other elements associated with the page-oriented information asset.

Figure 5:
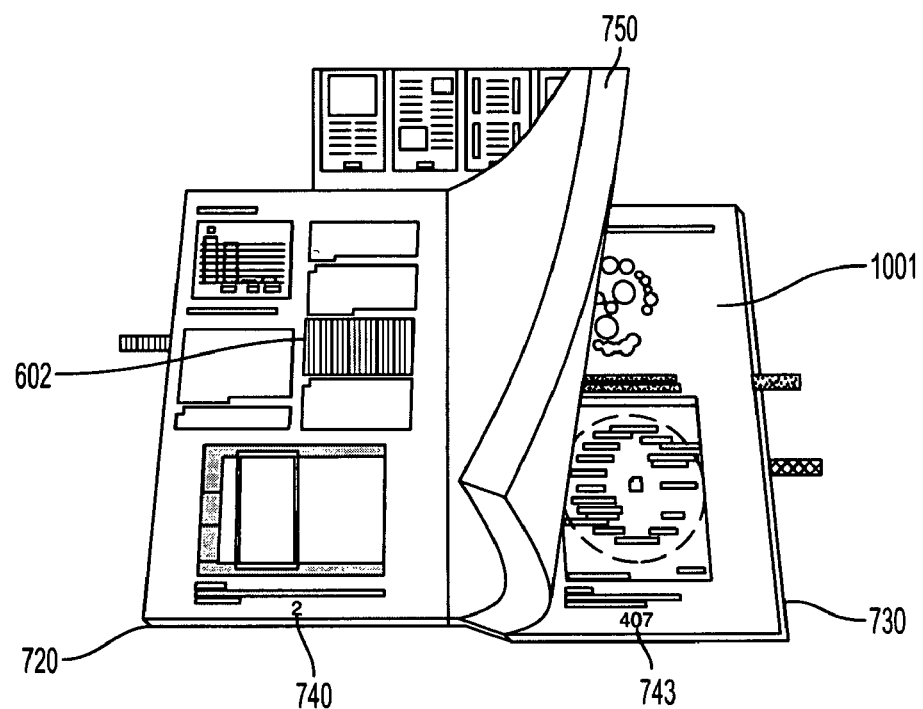
FIG. 5 is an exemplary two page 3-dimension-like visual rendering according to an aspect of this invention.

FIG. 5 is an exemplary two page 3-dimension-like visual rendering according to an aspect of this invention. Selectable representations of the elements of the page-oriented information asset 1001 are visually displayed on the screen of the output device. An exemplary inter-element context indicator 602 shows how the current output element fits within the page-oriented information asset. The paragraph containing the element currently being spoken via the audio output mode is highlighted.

The spatial context indicators 720-730 indicate the spatial location within the page-oriented information asset as a whole. The exemplary spatial context indicators 720-730 are placed on either side of the element display area indicating how many pages have been turned and how many pages remain. This provides an intuitive orientation as to the spatial position of the current element within the page-oriented information asset 1001. It will be apparent that in right to left oriented languages the spatial context indicator are placed on the left and right of the display area. For languages having top to bottom or right to left reading orientations, the inter-element and spatial context indicators may be appropriately adjusted without departing from the spirit or scope of this invention.

The user navigates within the page-oriented information asset by selecting exemplary visual representations of the elements on the screen of the visual output device or via user interface elements such as switches, buttons or the like. Selecting a visual representation of an element that precedes the current output element moves the current output element to the selected element. In embodiments utilizing gesture computing, repetitions and/or other gestures or gesture modifiers may be used to select larger or smaller sized elements to be navigated without requiring the user to explicitly specify a mode change for the interface. The audio output is then set to begin with the newly selected element. Navigation over larger elements such as pages is provided by selecting the relevant page using the selectable inter-element context indicator 602, the selectable first and second spatial context indicators 720-730 and/or via gestures over the selectable elements. In other embodiments, specific buttons are provided to navigate to prior or following pages, chapters, sections, paragraphs, sentences and/or other elements associated with structurally or logical defined portions of the page-oriented information asset.

Thus, in another exemplary embodiment, the spatial context indicator is provided by a 3-dimension-like representation of the page-oriented information asset rendered on the display of a cell-phone or pocket computer display. The spatial context indicator may be represented by 3-dimension-like representations of stacks of pages. This provides the user with an intuitive indication of spatial location within the page-oriented information asset. In various exemplary embodiments, requested navigation over pages, chapters, sections, paragraphs and/or other structures of the page-oriented information asset are indicated by gestures. A twice repeated forward gesture over a defined element might indicate a request to navigate to a following higher level structure. That is, the next paragraph might be indicated by two forward gestures and the next sentence by a single forward gesture or the like. Animated page turns 750 are used to orient the user within the page-oriented information asset and indicate how large a navigation jump has occurred.

Figure 6:
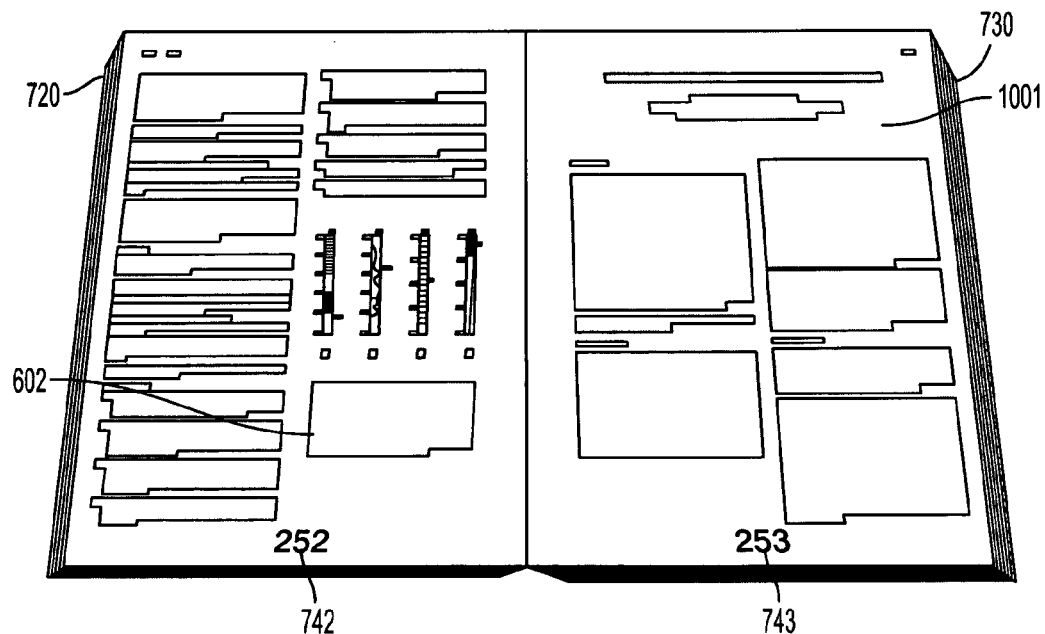
FIG. 6 is a second exemplary two page 3-dimension-like visual rendering according to an aspect of this invention.

FIG. 6 is a second exemplary two page 3-dimension-like visual rendering according to an aspect of this invention. An inter-element context indicator 602 highlights the paragraph containing the current output element orienting the user within the page-oriented information asset. A first spatial context indicator 720 is positioned at the far left of display area indicating the spatial position of the currently displayed element within the page-oriented information asset. A second spatial context indicator 730 is positioned on the right of the indicating how many pages remain to be read. Page numbers 742-743 indicate specific page numbers within the page-oriented information asset.

Figure 7:
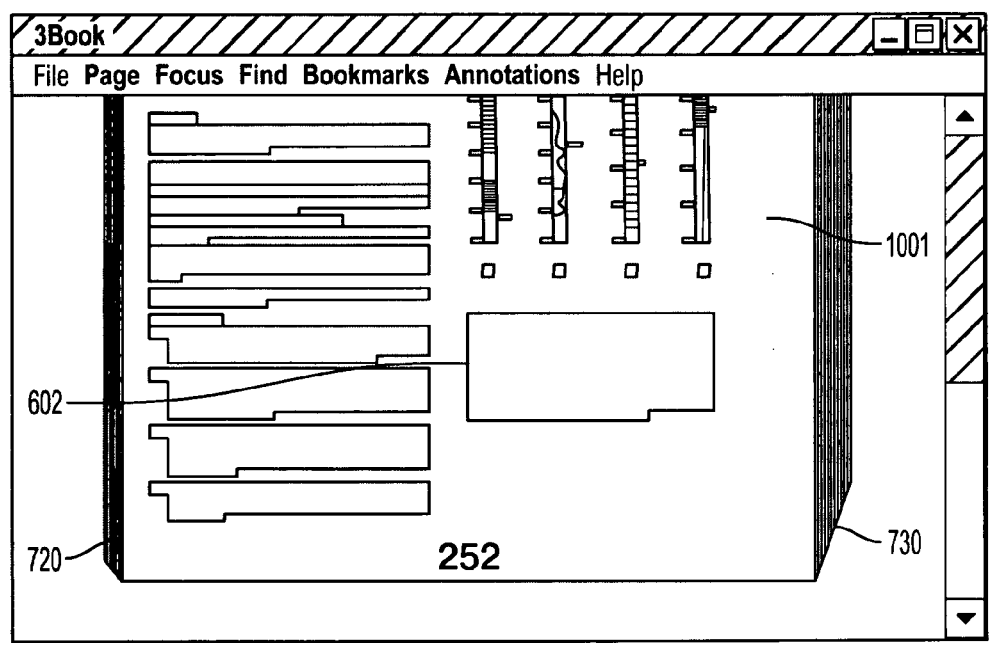
FIG. 7 is a third exemplary two page 3-dimension-like visual display according to an aspect of this invention.

FIG. 7 is a third exemplary two page 3-dimension-like visual display according to an aspect of this invention. A first portion 720 of the spatial context indicator shows how many pages precede the current element by the width of the outline or shadow. The second portion 730 of the spatial context indicator shows that there remain many elements following the current element within the page-oriented information asset 1001 as a whole. This shows how the current element currently being output fits within the surrounding elements of the page-oriented information asset 1001. Thus, a quick glance orients a user within the page-oriented information asset 1001.

In various embodiments, the page-oriented information assets are comprised of audio-books, audio-magazines, audio-newspapers and/or other page-oriented audio information. It will also be apparent that in various embodiments according to this invention, the audio information is directly recorded from an audio source such as a speaker or may be programmatically generated using text to speech systems or the like.

In the various embodiments of the system for navigating page-oriented information assets 100, each of the circuits 10-50 outlined above can be implemented as portions of a suitably programmed general-purpose computer. Alternatively, 10-50 of the system for navigating page-oriented information assets 100 outlined above can be implemented as physically distinct hardware circuits within an ASIC, or using a FPGA, a PDL, a PLA or a PAL, or using discrete logic elements or discrete circuit elements. The particular form each of the circuits 10-50 of the system for navigating page-oriented information assets 100 outlined above will take is a design choice and will be obvious and predictable to those skilled in the art.

Moreover, the system for navigating page-oriented information assets 100 and/or each of the various circuits discussed above can each be implemented as software routines, managers or objects executing on a programmed general purpose computer, a special purpose computer, a microprocessor or the like. In this case, the system for navigating page-oriented information assets 100 and/or each of the various circuits discussed above can each be implemented as one or more routines embedded in the communications network, as a resource residing on a server, or the like. The system for navigating page-oriented information assets 100 and the various circuits discussed above can also be implemented by physically incorporating the system for navigating page-oriented information assets 100 into software and/or hardware system, such as the hardware and software systems of a web server or a client device.

As shown in FIG. 3, memory 15 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1 & 3, can each be any known or later developed device or system for connecting a communication device to the system for navigating page-oriented information assets 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A computer-implemented system for navigating page-oriented information asset, comprising:
 a memory; and
 a processor operatively coupled to the memory and configured to execute computer executable program circuits, including:
 an input/output circuit retrieving a page-oriented information asset, which incorporates audio speech information organized into pages;
 an element determination circuit determining a plurality of elements within the page-oriented information asset organized into structure levels respectively comprising chapters, sections, paragraphs, sentences and words;
 a current output element circuit outputting each of the elements via an audio mode during a playback;
 a context circuit indicating how the current output element relates to the other element and where the current output element is located within the page-oriented information asset and is associated with an animation;
 a rendering circuit rendering the elements via a visual output mode in a 3-dimension-like rendering during a playback; and
 a spatial context circuit moving through the structure levels and the pages of the page-oriented information asset during a navigation in a direction indicated by an ordering of the structure levels and by a degree of input speed in a user-generated gesture,
 wherein the processor determines graphical elements associated with the page-oriented information asset and outputs attention attracting display characteristics via the audio output mode when the graphical elements are associated with the current element in the audio presentation.

2. The computer-implemented system of claim 1, in which the 3-dimensional like rendering incorporates user-interface elements for navigation within the page-oriented information asset.

3. The computer-implemented system of claim 2, in which navigation within the page-oriented information asset is based on at least one of: pushing, sliding, touching, and activating, at least one user-interface element.

4. The computer-implemented system of claim 1, in which the plurality of elements associated with the page-oriented information asset are determined based on at least one of: mark-up and parsing; and the user interface elements are at least one of: a touch sensitive display, a switch, a button and voice input.

5. The computer-implemented system of claim 1, in which the page-oriented information asset is trans-coded between different media types.

6. The computer-implemented system of claim 1, in which the graphical elements are at least one of: figures, photos, movies, footnotes, side bar commentaries, links to related articles, drawings, and markers for the end of elements.

7. The computer-implemented system of claim 1, in which the page-oriented asset is at least one of: an audio-book, an audio-newspaper; and an audio-magazine.

8. The computer-implemented system of claim 1, in which a single user-interface element is used for navigating across multiple structural levels.

9. A computer-implemented method for navigating a page-oriented information asset, comprising:
 retrieving a page-oriented information asset, which incorporates audio speech information organized into pages;
 determining a plurality of elements within the page-oriented information asset organized into structure levels respectively comprising chapters, sections, paragraphs, sentences and words;
 outputting each of the elements via an audio mode during a playback;
 indicating how the current output element relates to the other element and where the current output element is located within the page-oriented information asset and is associated with an animation;
 rendering the elements via a visual output mode in a 3-dimension-like rendering during a playback; and
 moving through the structure levels and the pages of the page-oriented information asset during a navigation in a direction indicated by an ordering of the structure levels and by a degree of input speed in a user-generated gesture,
 wherein the processor determines graphical elements associated with the page-oriented information asset and outputs attention attracting display characteristics via the audio output mode when the graphical elements are associated with the current element in the audio presentation.

10. The computer-implemented method of claim 9, in which the 3-dimensional like rendering incorporates user-interface elements for navigation within the page-oriented information asset.

11. The computer-implemented method of claim 10, in which navigation within the page-oriented information asset is based on at least one of: pushing, sliding, touching, and activating, at least one user-interface element.

12. The computer-implemented method of claim 9, in which the plurality of elements associated with the page-oriented information asset are determined based on at least one of: mark-up and parsing; and the user interface elements are at least one of: a touch sensitive display, a switch, a button and voice input.

13. The computer-implemented method of claim 9, in which the page-oriented information asset is trans-coded between different media types.

14. The computer-implemented method of claim 9, in which the graphical elements are at least one of: figures, photos, movies, footnotes, side bar commentaries, links to related articles, drawings, and markers for the end of elements.

15. The computer-implemented method of claim 9, in which the page-oriented asset is at least one of: an audio-book, an audio-newspaper; and an audio-magazine.

16. The computer-implemented method of claim 9, in which a single user-interface element is used for navigating across multiple structural levels.

* * * * *